United States Patent
Shimizu et al.

(10) Patent No.: US 6,448,989 B1
(45) Date of Patent: *Sep. 10, 2002

(54) IMAGE FORMING APPARATUS USING DIGITAL LIGHT AS IMAGE EXPOSURE MEANS

(75) Inventors: Yasushi Shimizu, Toride; Masanobu Saito; Gaku Konishi, both of Kashiwa; Hiroshi Sato, Moriyamachi, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,699

(22) Filed: Sep. 23, 1997

(30) Foreign Application Priority Data

Sep. 25, 1996 (JP) .............................. 8-253009

(51) Int. Cl.⁷ .............................. B41J 2/385; B41J 2/47
(52) U.S. Cl. ........................ 347/131; 347/240; 347/251
(58) Field of Search ................................. 347/131, 240, 347/253, 254, 251; 250/235, 205; 399/128, 222, 346; 430/126, 306; 358/298

(56) References Cited

U.S. PATENT DOCUMENTS

| | | | | |
|---|---|---|---|---|
| 4,463,364 A | * | 7/1984 | Tamura | 347/253 |
| 4,610,950 A | * | 9/1986 | Milliken | 430/306 |
| 4,686,363 A | * | 8/1987 | Schoon | 250/235 |
| 5,561,285 A | * | 10/1996 | Sakata et al. | 250/205 |
| 5,731,122 A | * | 3/1998 | Yoshida et al. | 430/126 |
| 5,740,502 A | * | 4/1998 | Kobayashi et al. | 399/128 |

* cited by examiner

*Primary Examiner*—Hai Pham
(74) *Attorney, Agent, or Firm*—Fitzpatrick, Cella, Harper & Scinto

(57) ABSTRACT

The present invention relates to an image forming apparatus in which an electrostatic latent image is formed on an electrophotographic photosensitive member with digital light, and electrostatically developed with a developer to form a developed image. The apparatus has an exposure device for normally increasing the reflection density only in a specified region on the photosensitive member in a white image portion where no image is basically formed, in the horizontal scanning direction of the digital light. For example, a small amount of developer is supplied to either end of the photosensitive member having the tendency that the amount of the developer supplied is small, thereby preventing the occurrence of image flow at either end.

19 Claims, 13 Drawing Sheets

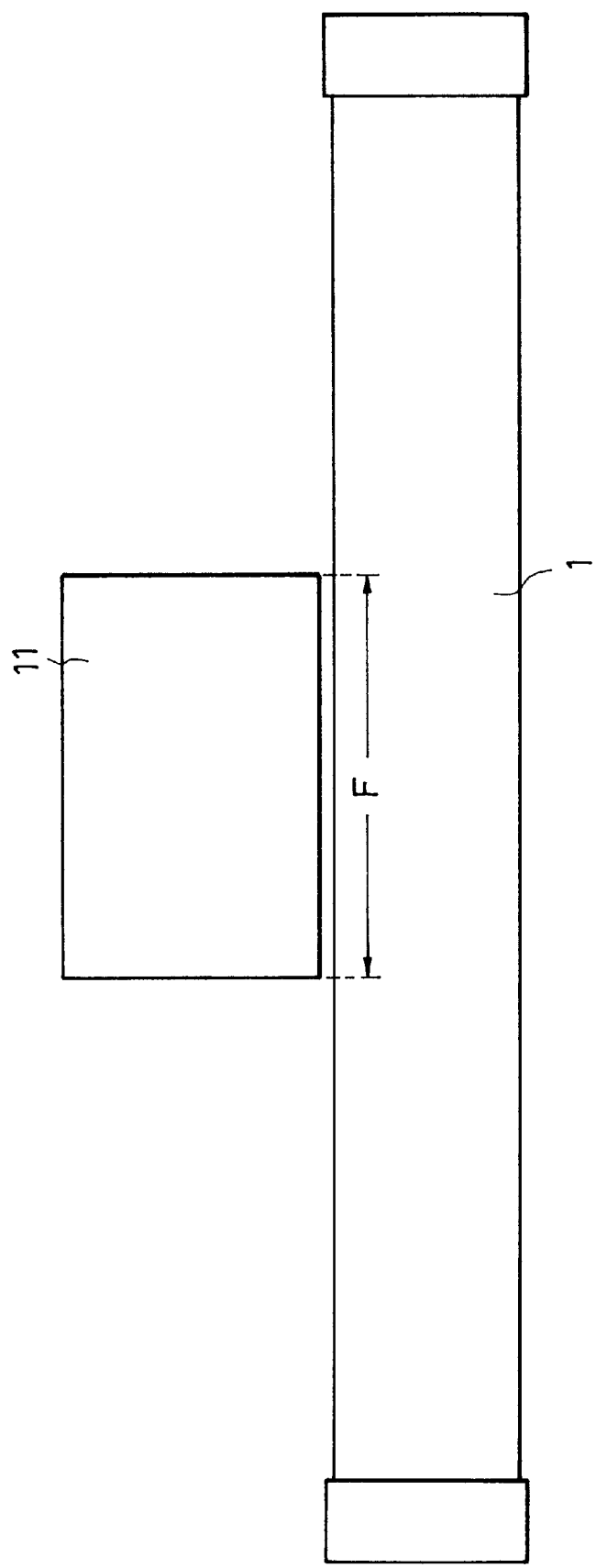

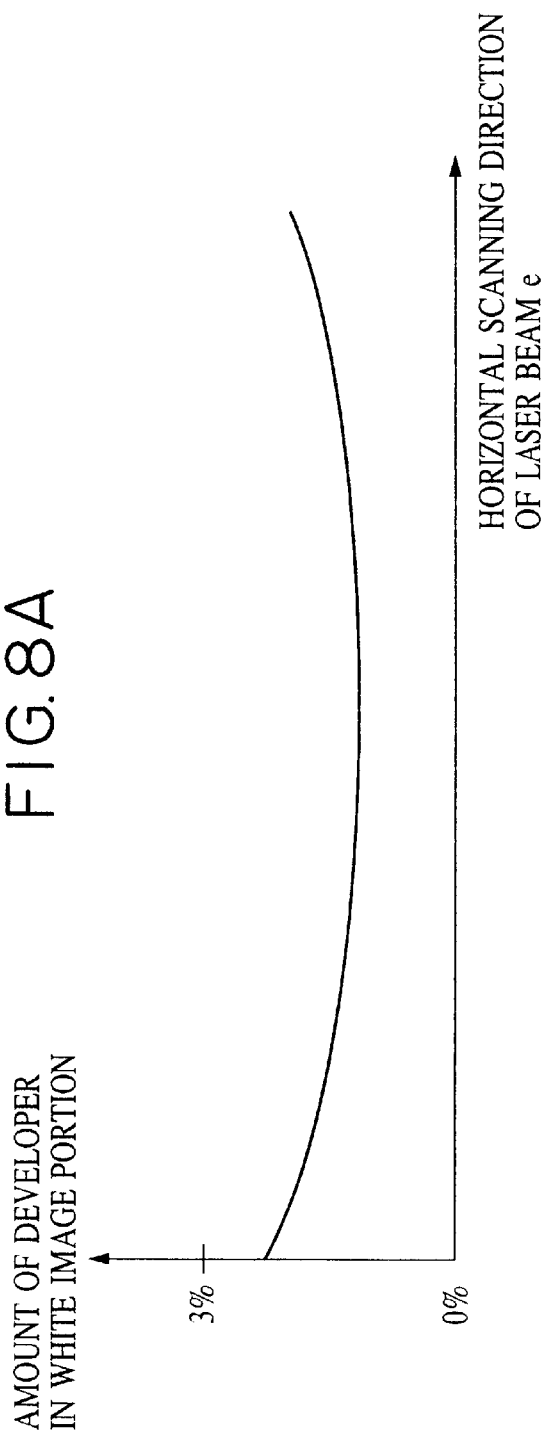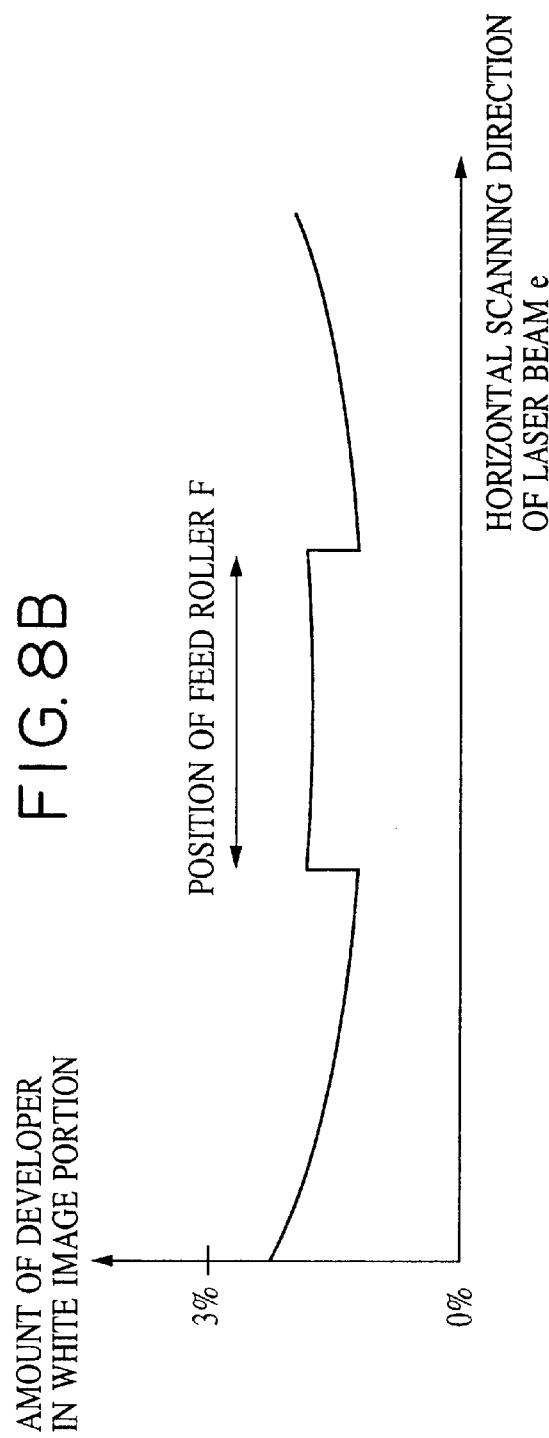

IMAGE FORMING APPARATUS USING DIGITAL LIGHT AS IMAGE EXPOSURE MEANS

BACKGROUND OF THE INVENTION

1. Field of the Invention

The present invention relates to an image forming apparatus for forming images, such as an electrophotographic printer, a copying machine or the like.

2. Description of the Prior Art

A conventional electrophotographic image forming apparatus for forming images by using an electrophotographic process comprises a drum-shaped or belt-shaped electrophotographic photosensitive member 1 for forming images, a charging device 2 for uniformly charging the photosensitive member 1, an exposure device 10 for forming a latent image on the photosensitive member 1, a development device 3 for developing the latent image on the photosensitive member 1 to form a developed image, a transfer device 4 for transferring the developed image onto transfer paper 8, a fixing device 9 for fixing the image on the transfer paper 8, a cleaning device 5 for cleaning off the residual developer remaining on the photosensitive member 1 after transfer, as shown in FIG. 14.

Particularly, in a small electrophotographic apparatus, the photosensitive member 1, the charging device 2, the development device 3, the cleaning device 5, etc. are integrated to form a process cartridge, which can be exchangeably mounted on the electrophotographic apparatus body including the transfer device 4 and the fixing device 9.

In the development process for forming an image on the photosensitive member 1, a potential difference is made between an exposed portion on the photosensitive member 1 and the other portion to selectively transfer the charged developer 7 onto the photosensitive member 1 from the development device 3. In this process, the developer 7 adheres to the exposed portion, and no developer 7 adheres to the unexposed portion.

However, in fact, the developer 7 is attracted by the unexposed portion because the charged developer 7 has nonuniformity in polarity, and thus a problem referred to as "fogging" occurs in an image in which a trace amount of developer 7 adheres to a white image portion. Various studies have been made to decrease the fogging.

On the other hand, a decrease in fogging causes a reduction in constant amount of the developer on the photosensitive member. In such a system with an extremely small amount of the developer, when white images or similar images with a low rate of printing are continuously formed, the frictional force between the photosensitive member and the rubber portion of the cleaning blade is increased, thereby causing problems of blade noise due to vibrations of the photosensitive member and the cleaning blade, and peeling of the cleaning blade.

Further, the transfer paper 8 onto which the developed image on the photosensitive member 1 is transferred contains various additives for bleaching, etc. Some of the additives adhere to the photosensitive member 1 as a result of the repetition of contact between the transfer paper 8 and the photosensitive member 1, and cause a poor quality image. This is caused by the fact that the surface of the photosensitive member 1 is covered with water due to additives having relatively high water absorptivity under high humidity, and thus the resistance of the photosensitive member 1 is decreased, thereby causing a disturbance in the charge distribution formed by the latent image on the photosensitive member and thus poor charging.

Since image forming apparatuses have been used in many places all over the world with development in the image forming apparatuses, the image forming apparatus have been increasingly used in a high-humidity environment where no image forming apparatus has been previously been used. Further, paper containing large amounts of components, which adversely affect charging have been increasingly used as the transfer paper 8, and the problem with respect to poor charging has been increased.

In order to prevent the occurrence of poor charging, it is effective to apply a large amount of developer 7 to the photosensitive member 1. In this case, the developer 7 functions as an abrasive for the additives, which adhere to the photosensitive member 1, and thus has the effect of suppressing adhesion of the additives.

Therefore, fogging has the effect of preventing a flow of an image due to the poor charging, and a small amount of developer 7, which causes no faulty image, is uniformly supplied to the photosensitive member 1 in order to prevent a flow of an image.

On the other hand, another method for preventing the flow of an image is employed in which an image is formed on the photosensitive member and the developer is adhered thereto between the process performed on the photosensitive member, for forming an image on the transfer paper 8, and the next image forming process, while the abrasion effect of the developer 7 due to fogging is not employed.

However, in the above conventional example, the small amount of developer supplied onto the photosensitive member has a nonuniform distribution, and the amount of the developer supplied changes with its placement according to the circulation state of the developer in the development container.

In addition, the flow of an image does not uniformly occur, and, particularly, it easily occurs in a portion such as the position of a feed roller where a large amount of paper dust is present.

The amount of fogging can generally be controlled to some extent by appropriately designing the process of the development unit, controlling the electric field applied to the developer, and the like. However, the function of this method is to uniformly control the amount of fogging over the whole image, and thus it is impossible to produce fogging only in a specified portion of an image.

For a poor image, which can be solved by constantly supplying a small amount of developer, therefore, when the amount of fogging is determined to the specified portion, even if fogging in the specified portion of an image is unrecognizable, fogging more occurs in the other portion, thereby causing the problem of finally forming a poor image.

When a constant amount of developer is supplied onto the photosensitive member between the processes for forming images on the transfer paper, there is the problem of consuming an excess of developer.

SUMMARY OF THE INVENTION

An object of the present invention is to solve the above problems and provide an image forming apparatus which can form a good image without a flow by supplying an appropriate amount of developer to a white image portion where no image is formed, while preventing improper friction of a cleaning blade.

In order to achieve the foregoing object, in accordance with a first aspect of the present invention, there is provided an image forming apparatus in which an electrostatic latent image is formed on an electrophotographic photosensitive member with a laser beam, and electrostatically developed with a developer to form a developed image, and the developed image is transferred to a transfer material to form an image on the transfer material, the apparatus comprising exposure means for normally increasing the reflection density only of a specified region in the horizontal scanning direction of the laser beam in a white image portion where no image is formed.

In accordance with a second aspect of the present invention, there is provided an image forming apparatus in which an electrostatic latent image is formed on the photosensitive member with a laser beam, and electrostatically developed with a developer to form a developed image, and the developed image is transferred onto a transfer material to form an image on the transfer material, the apparatus comprising exposure means for normally performing weak exposure only in a specified region of the photosensitive member in the horizontal scanning direction of the laser beam, regardless of exposure of a latent image by an exposure device for forming an image.

In accordance with a third aspect of the present invention, there is provided an image forming apparatus in which an electrostatic latent image is formed on the photosensitive member with a laser beam, and electrostatically developed with a developer to form a developed image, and the developed image is transferred onto a transfer material to form an image on the transfer material, the apparatus comprising exposure means for normally performing small spot exposure at intervals of predetermined amounts or more only in a specified region of the photosensitive member in the horizontal scanning direction of the laser beam, regardless of exposure of a latent image by an exposure device for forming an image.

In accordance with a fourth aspect of the present invention, the position of spot exposure by the exposure means in accordance with the third aspect of the present invention is never adjacent to the position of exposure for forming an image.

In accordance with a fifth aspect of the present invention, there is provided an image forming apparatus in which an electrostatic latent image is formed on the photosensitive member with a laser beam, and electrostatically developed with a developer to form a developed image, and the developed image is transferred onto a transfer material to form an image on the transfer material, the apparatus comprising exposure means for normally performing small spot exposure at intervals of predetermined amounts or more so that spots are never adjacent to the position of exposure for forming an image.

In accordance with a sixth aspect of the present invention, there is provided an image forming apparatus in which an electrostatic latent image is formed on the photosensitive member with a laser beam, and electrostatically developed with a developer to form a developed image, and the developed image is transferred onto a transfer material to form an image on the transfer material, the apparatus comprising a memory device for memorizing the integrated time of exposure by an exposure device for forming an image at each of positions in the horizontal scanning direction, and exposure means for forming images on the photosensitive member in spaces between respective transfer materials where no image is formed, according to the exposure time memorized in the memory means.

BRIEF DESCRIPTION OF THE DRAWINGS

FIG. 7 is a schematic front view of an image forming apparatus in accordance with the second embodiment;

FIGS. 8A and 8B are drawings illustrating the amount of a developer on a white image portion in the second embodiment;

DETAILED DESCRIPTION OF THE PREFERRED EMBODIMENTS

First Embodiment

Figure 1:
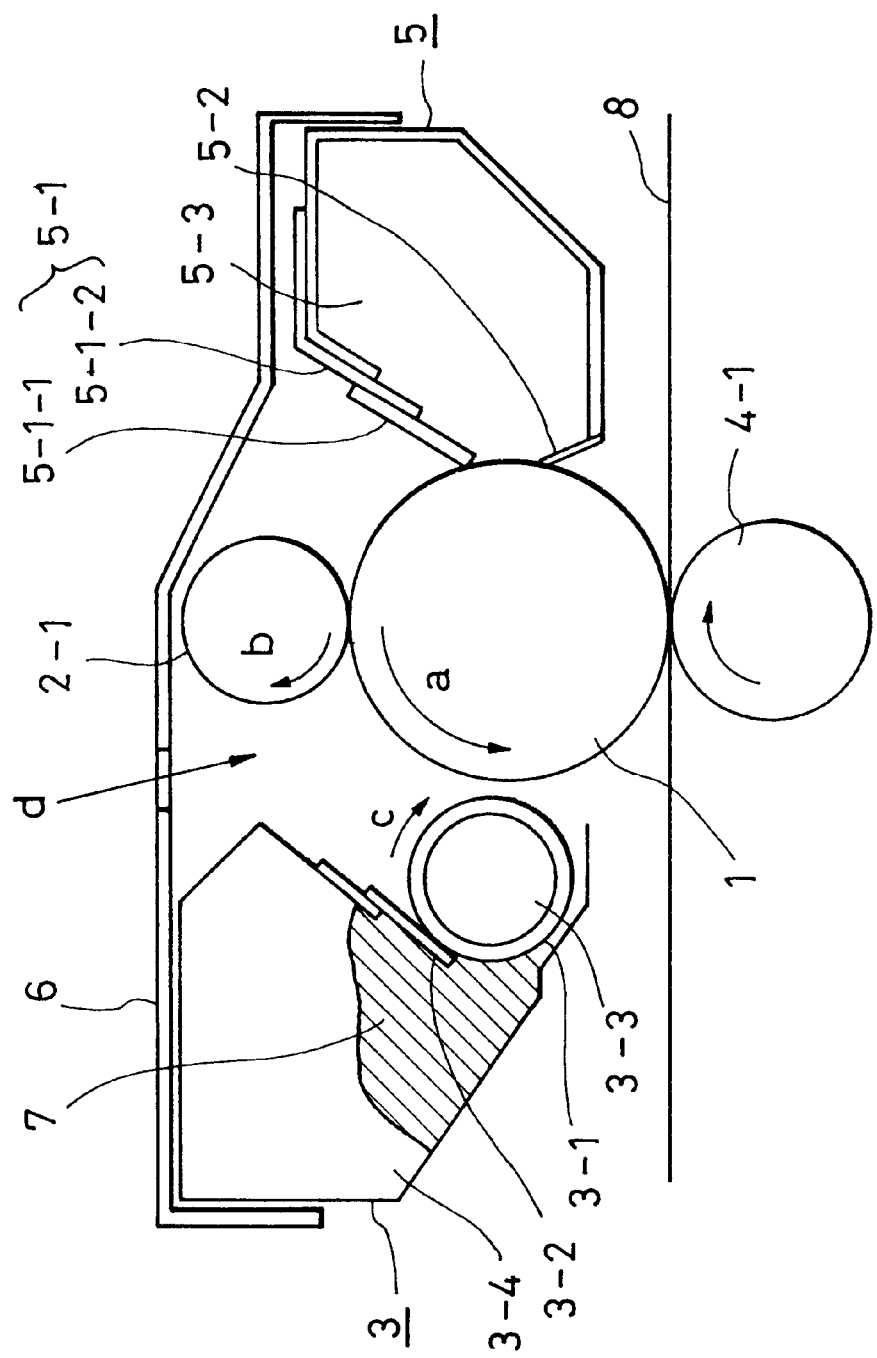
FIG. 1 is a schematic sectional view of an image forming apparatus in accordance with a first embodiment of the present invention.

FIGS. 1 to 5 show a first embodiment of the present invention. FIG. 1 is a schematic sectional view of an electrophotographic apparatus for use as an image forming apparatus. In this apparatus, an electrophotographic photosensitive member 1, which is rotated in the direction of arrow a, a charging roller 2-1 serving as a charging device, a development device 3, a transfer roller 4-1, and a cleaning device 5 are contained in a compact housing 6 to form a process cartridge. The development device 3 comprises a development sleeve 3-1 for transferring a developer 7, a development magnet 3-3, an elastic blade 3-2 for restricting the coating pressure of the development 7 on the development sleeve 3-1, and a development container 3-4. The cleaning device 5 comprises a cleaning member in which a rubber blade 5-1-1 and a support member 5-1-2 are integrated, a squeeze sheet 5-2 and a cleaning container 5-3.

The charging roller 2-1 contacts the photosensitive member 1 and follows the rotation of the photosensitive member 1 in the direction of arrow a to rotate in the direction of arrow b. The electrophotographic photosensitive member 1, which is charged by the charging roller 2-1, is exposed to a laser beam shown by arrow d to form a latent image.

Figure 4:
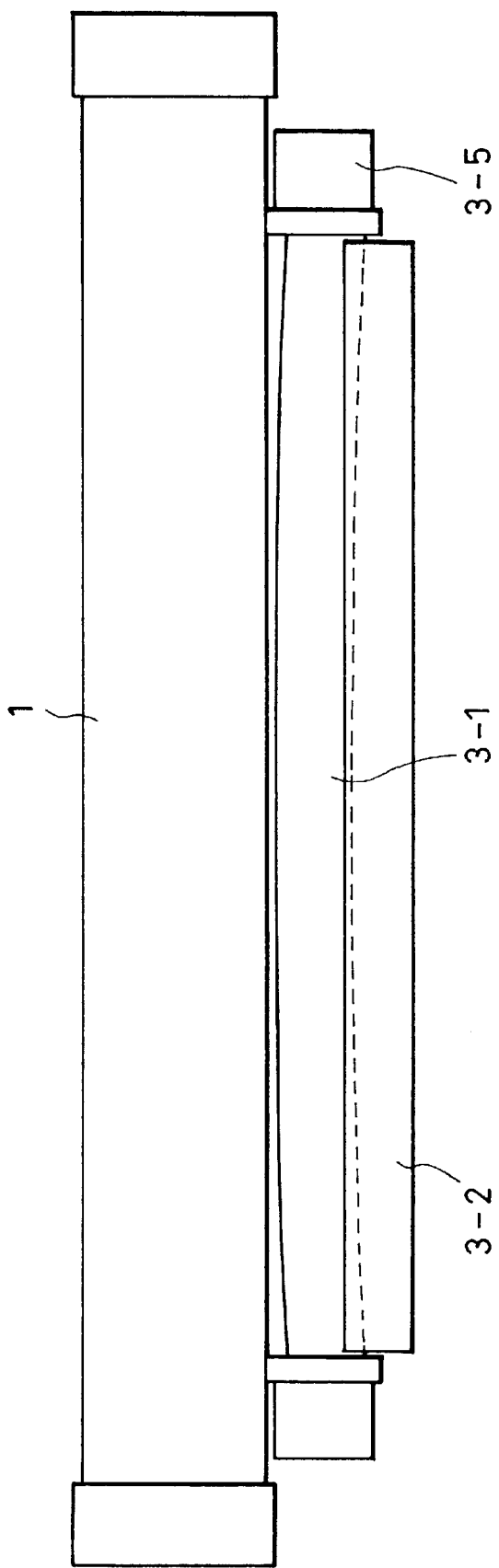
FIG. 4 is a schematic front view of the image forming apparatus in accordance with the first embodiment

The development device 3 is placed close to the photosensitive member with a small specified gap through a development roller 3-5 (FIG. 4). By rotating the development sleeve 3-1 in the direction of arrow c, the developer 7 is transferred and flies through the gap to develop the latent image. The latent image on the electrophotographic photosensitive member 1 is developed by the development device 3, and then transferred to a transfer material 8 such as transfer paper or the like by the transfer roller 4-1. At this time, the developer 7 remaining untransferred on the photosensitive member 1 is removed from the photosensitive member 1 by the cleaning device 5 comprising the cleaning container 5-3 and the cleaning member 5-1.

Figure 2:
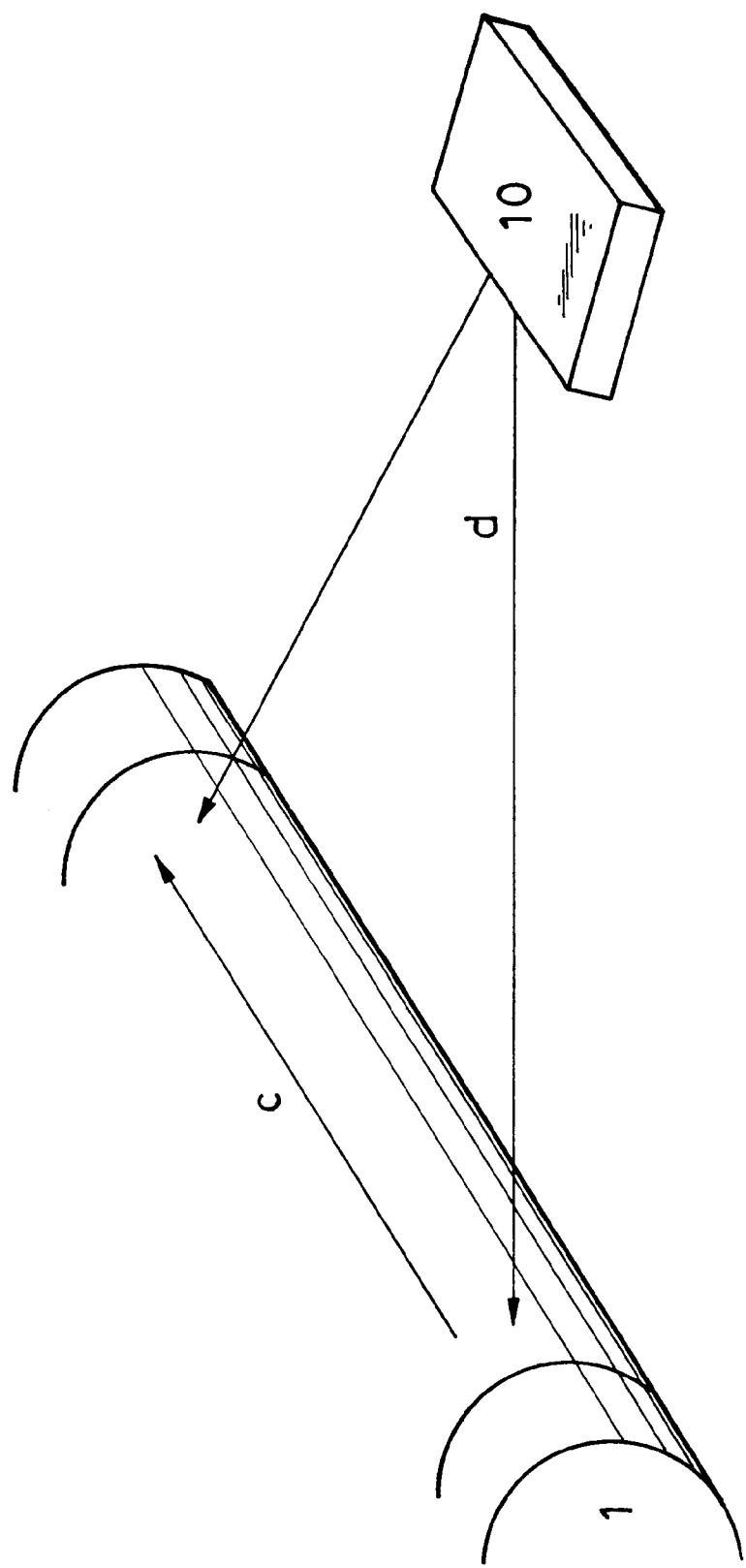
FIG. 2 is a perspective view illustrating laser exposure in the first embodiment.
Figure 3:
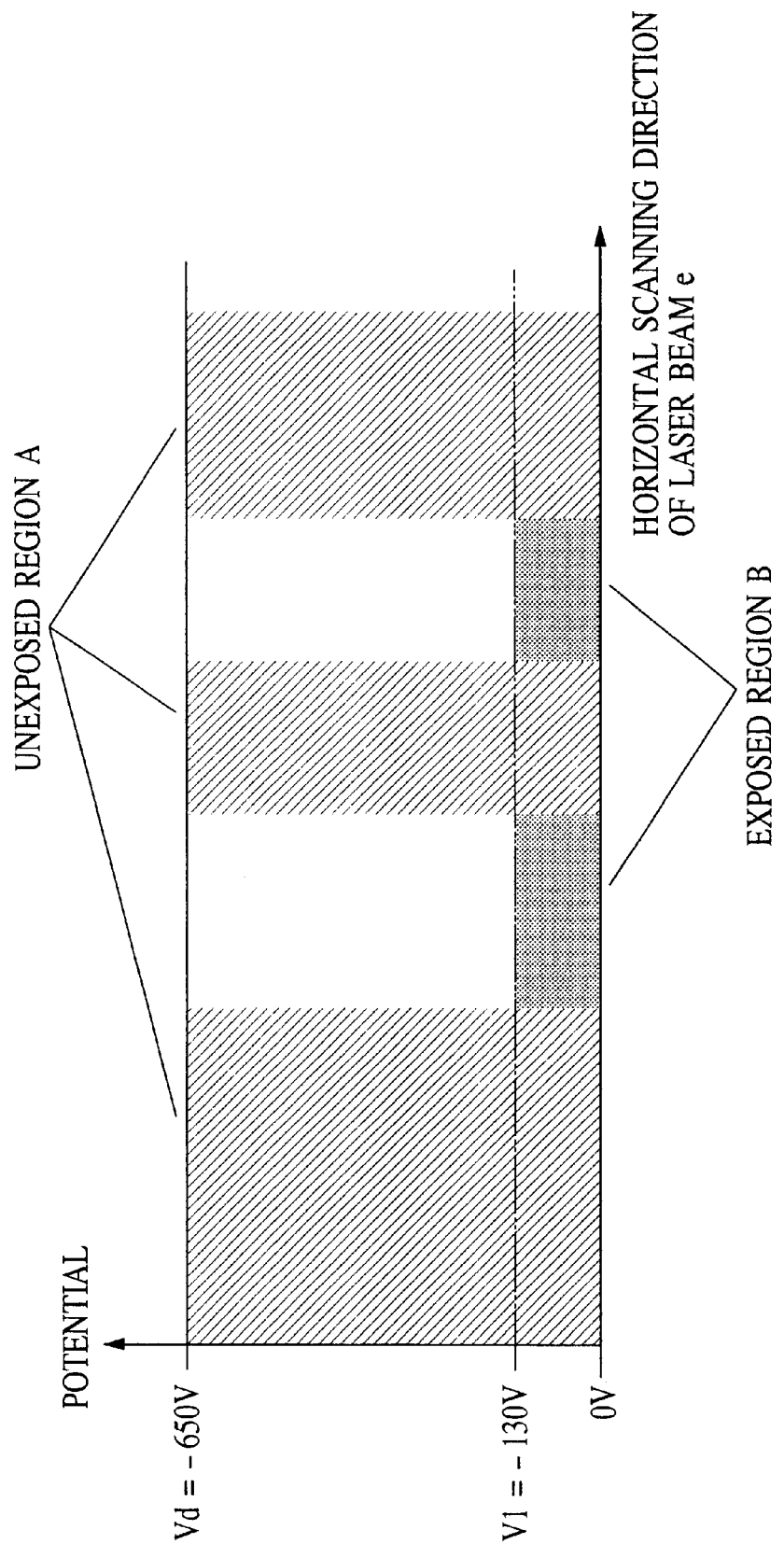
FIG. 3 is a drawing illustrating latent image potential in the first embodiment.

FIG. 2 shows the state where the photosensitive member 1 is exposed to the laser beam d. The laser beam d is set to be applied substantially at right angles to i-the surface of the photosensitive member 1. The laser beam d is lighted and applied in accordance with information while being scanned in the horizontal scanning direction e by a rotating mirror provided in an exposure device 10 to form a potential latent image on the photosensitive member 1. FIG. 3 shows the potential state of the latent image on the photosensitive member 1. In a uniformly charged region, the charge potential Vd of region A shown by slanting lines where no exposure to the laser beam d is carried out for forming a white portion is −650 V, while the potential V1 of region B shown by dots where exposure to the laser beam d is carried out for forming a character or the like is −130 V which is close to the ground potential 0 V.

In this embodiment, the region not exposed for forming a white portion is exposed to the laser beam with intensity lower than that of the exposure for forming a character or the like. The background exposure of the white portion is performed in a specified region thereof in the horizontal scanning direction, not uniformly performed over the entire white portion.

In this embodiment, the gap between the development sleeve 3-1 and the photosensitive member 1 at either end in the lengthwise direction is larger than that at the center due to the deflection of the development sleeve 3-1 caused by the pressure of the development blade 3-2 on the development sleeve 3-1, as shown in FIG. 4. Therefore, the amount of the developer 7 which adheres to either end of the photosensitive member 1 and causes the above-mentioned fogged image is larger than the amount of the developer which adheres to the central portion in the lengthwise direction, as shown by a dotted line E1 in FIG. 5.

In this embodiment, therefore, the background exposure is performed in the vicinity of either end of an image in the horizontal scanning direction. Regarding the latent image potential of a white image portion on the photosensitive member 1 in the horizontal scanning direction, the charge potential Vd in a region not subjected to background exposure is set to −650 V, while the potential of a white image portion at either end subjected to background exposure is set to −600 V so that the developer 7 is slightly adhered.

Figure 5:
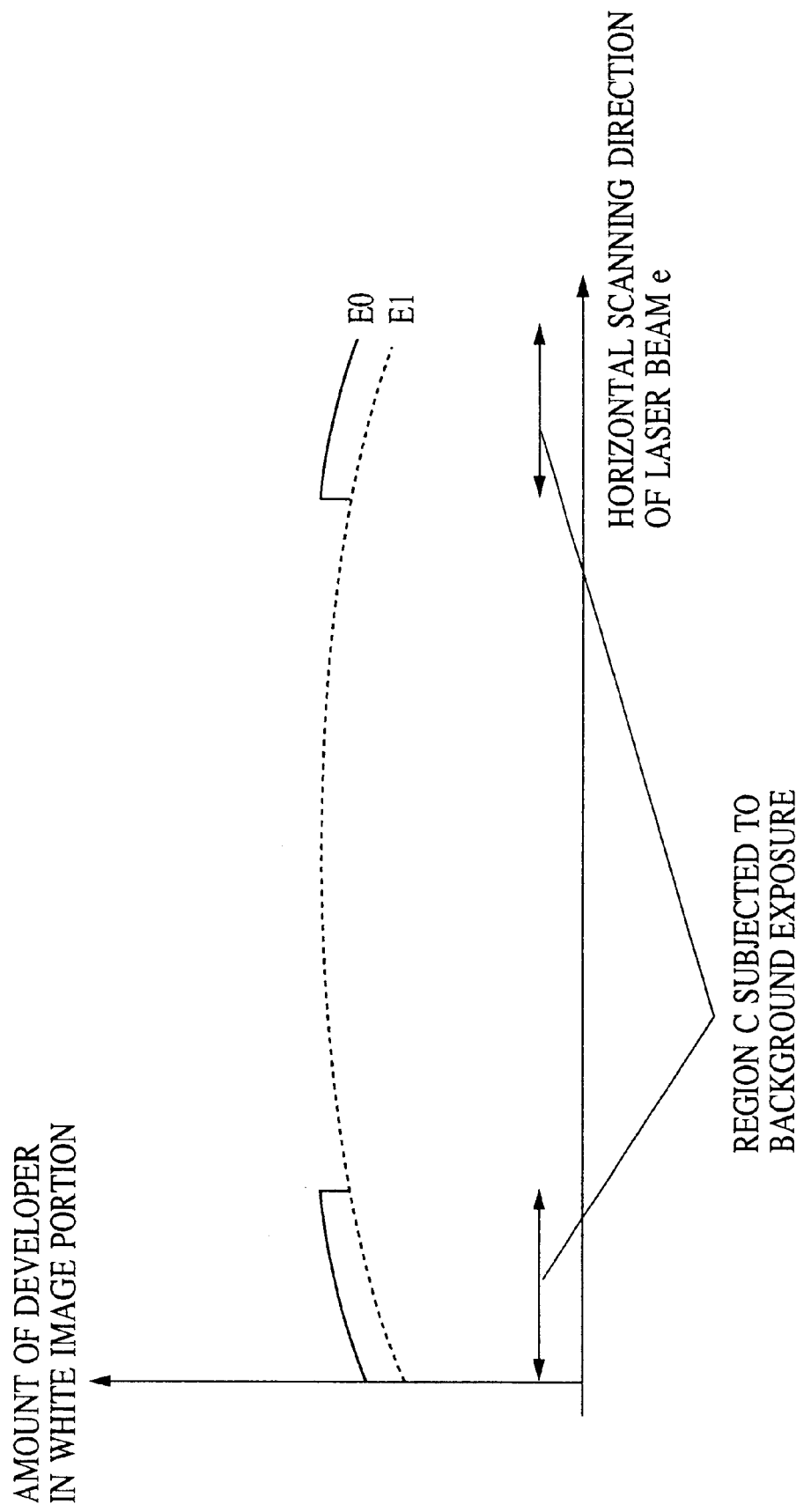
FIG. 5 is a drawing showing the amount of a developer on a white image portion in the first embodiment when the present invention is carried out.

As a result, as shown by solid lines E0 in FIG. 5, changes with place in the amount of the developer 7 which adheres to the photosensitive member 1 to cause the fogged image are decreased, as compared with the case shown by the dotted line E1 in FIG. 5 where the present invention is not carried out.

This embodiment does not cause the phenomenon of a flow on an image which occurs only at both ends of an image in the case where the present invention is not carried out, and can thus suppress the formation of a faulty image.

The amount of fogging on an image is very small and is thus insignificant on the image. This embodiment also makes it possible to obtain stable good images over a long period of time without the need for appropriately selecting the operation environment and type of paper.

As described above, in this embodiment, weak exposure is carried out in a specified region even in a white image portion, which is not exposed basically, in the horizontal scanning direction to produce a little larger fogging than the fogging which basically occurs in that portion. This embodiment thus has the effect of preventing the occurrence of poor charging and a flow of an image without deteriorating the image quality, and the effect of suppressing the occurrence of a noise of the cleaning blade or peel of the cleaning blade.

Second Embodiment

Figure 6:
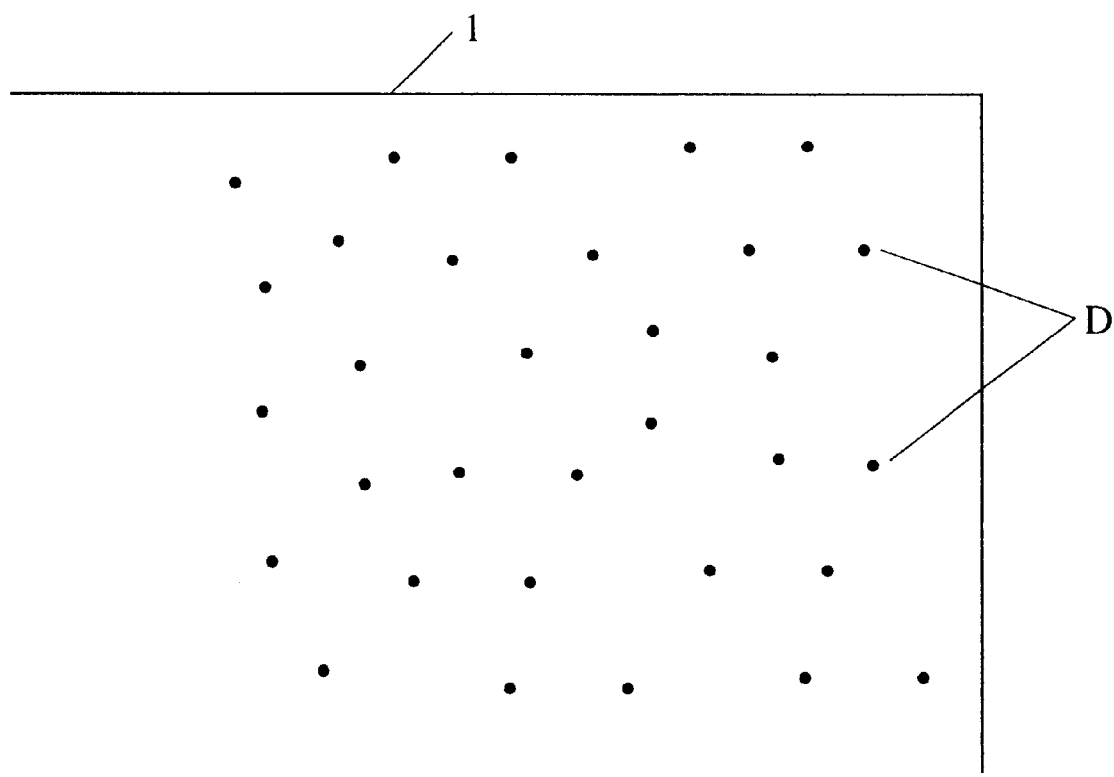
FIG. 6 is a drawing illustrating exposure on an electrophotographic photosensitive member in accordance with a second embodiment.

FIGS. 6 to 8 show a second embodiment of the present invention. The construction of an electrophotographic apparatus of this embodiment is the same as the first embodiment.

In this embodiment of the invention, there are exposed portions in a region, which is not exposed basically for forming a white portion. FIG. 6 shows the state of a latent image portion for forming a white image wherein small spot exposure D is carried out at intervals on the photosensitive member 1.

In this embodiment, the diameter of one spot is about 70 $\mu$m, and one spot exposure is carried out in a region of about 440 $\mu$m square on average, the average area ratio of the exposed portion in this region being about 2%. This exposure is carried out, for example, by controlling the laser beam. Although the amount of the developer 7 of the developed latent image transferred to the transfer paper 8 is decreased by 2% or less, such a degree of reduction in the amount of the developer transferred to the transfer paper 8 permits adhesion of the developer 7 to the photosensitive member 1 without adversely affecting an image. In regard to the intervals of the spot exposure D, one spot exposure is carried out in a region of 440 $\mu$m square on average, and the positions of the spot exposure are randomly arranged in the horizontal scanning direction. When repeating the exposure, the average exposure is uniform in the horizontal scanning direction.

In this embodiment, the photosensitive member 1 and a paper feed roller 11 for feeding and conveying the transfer paper 8, which is not shown in FIG. 1, have such a positional relationship as shown in FIG. 7. Where the present invention is not carried out, in the entire image formation region, the phenomenon of a flow of an image as a fault of an image, which has been described above with reference to a conventional example, worsens in region F where the feed roller 1 is present, as compared with the other region. This is caused by the fact that the amount of the paper dust produced in the region F due to friction with the transfer paper in conveyance of the transfer paper 8 is larger than that in the other region.

On the other hand, FIG. 8(A) shows the distribution of the amount of the developer 7 of fogging produced on the photosensitive member 1 in the horizontal scanning direction, which is based on the characteristics of the development device 3 of this embodiment. As shown in FIG. 8(A), the amount of the developer 7 in the central portion of an image, which was measured by reflection density measurement, is 1% or less, while the amount of the developer 7 in the vicinity of either end of the image is 2.3%.

FIG. 8(B) shows the distribution of the amount of the developer 7 of fogging produced on the photosensitive member 1 in the horizontal scanning direction in formation of a white image when small spot exposure is carried out in the region F in this embodiment. As shown in FIG. 8(B), although the amount of the developer in the region F with the feed roller is increased, the reflection density does not exceed 3% over the entire region, and the fogging is not recognized as a fault in an image. On the other hand, it is possible to suppress the occurrence of an image flow in the region of the feed roller 11. It is also possible to obtain stable good images over a long period of time without the need for appropriately selecting the operation environment and the type of paper.

As described above, in this embodiment, small spot exposure is normally carried out in a specified region in the horizontal scanning direction even in a white image portion which is not exposed basically, to produce a little larger fogging in that portion than fogging which is basically produced therein. It is thus possible to prevent the occurrent of poor charging and a flow of an image without deteriorating the image quality, and suppress the occurrence of cleaning blade noise or peeling of the cleaning blade.

Third Embodiment

Figure 9:
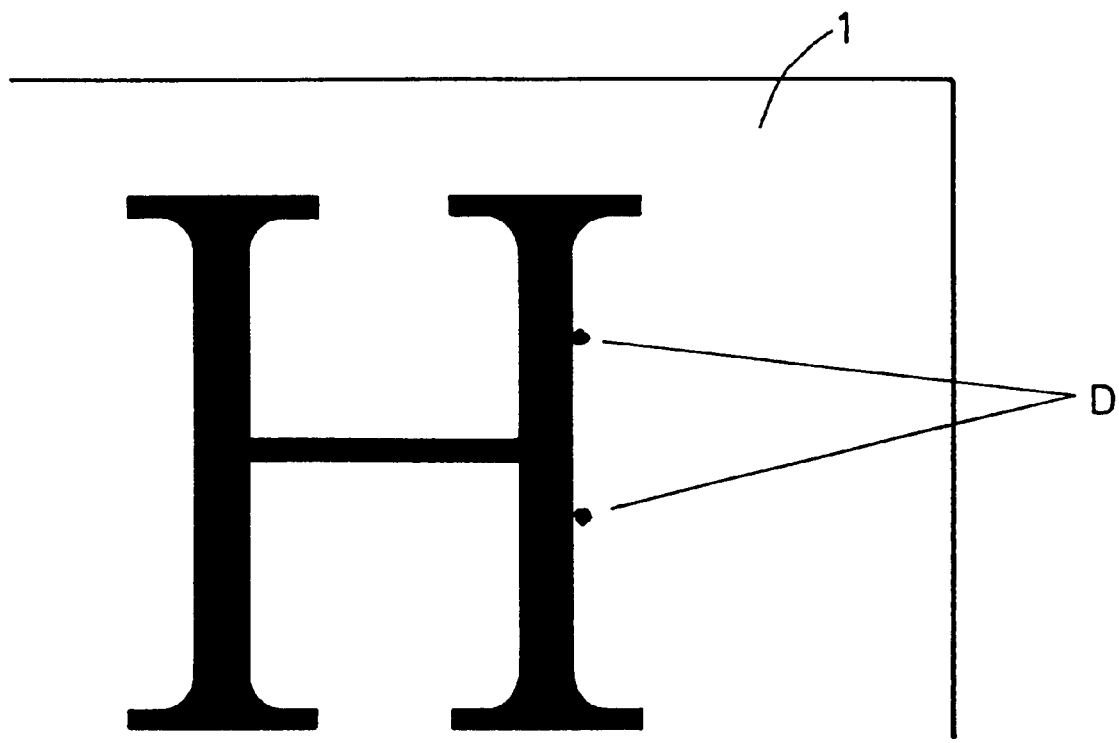
FIG. 9 is a drawing illustrating exposure on an electrophotographic photosensitive member in accordance with a third embodiment.
Figure 10:
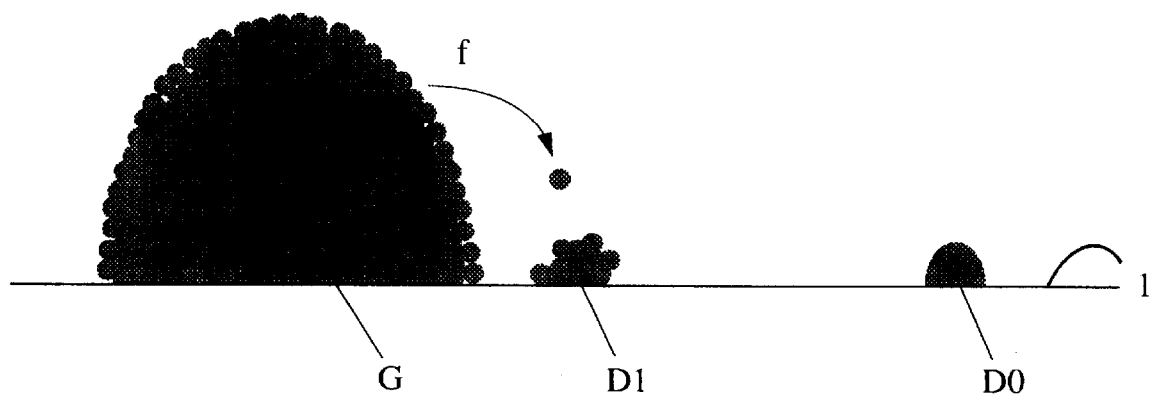
FIG. 10 is a drawing illustrating a developer on the photosensitive member in accordance with the third embodiment.
Figure 11:
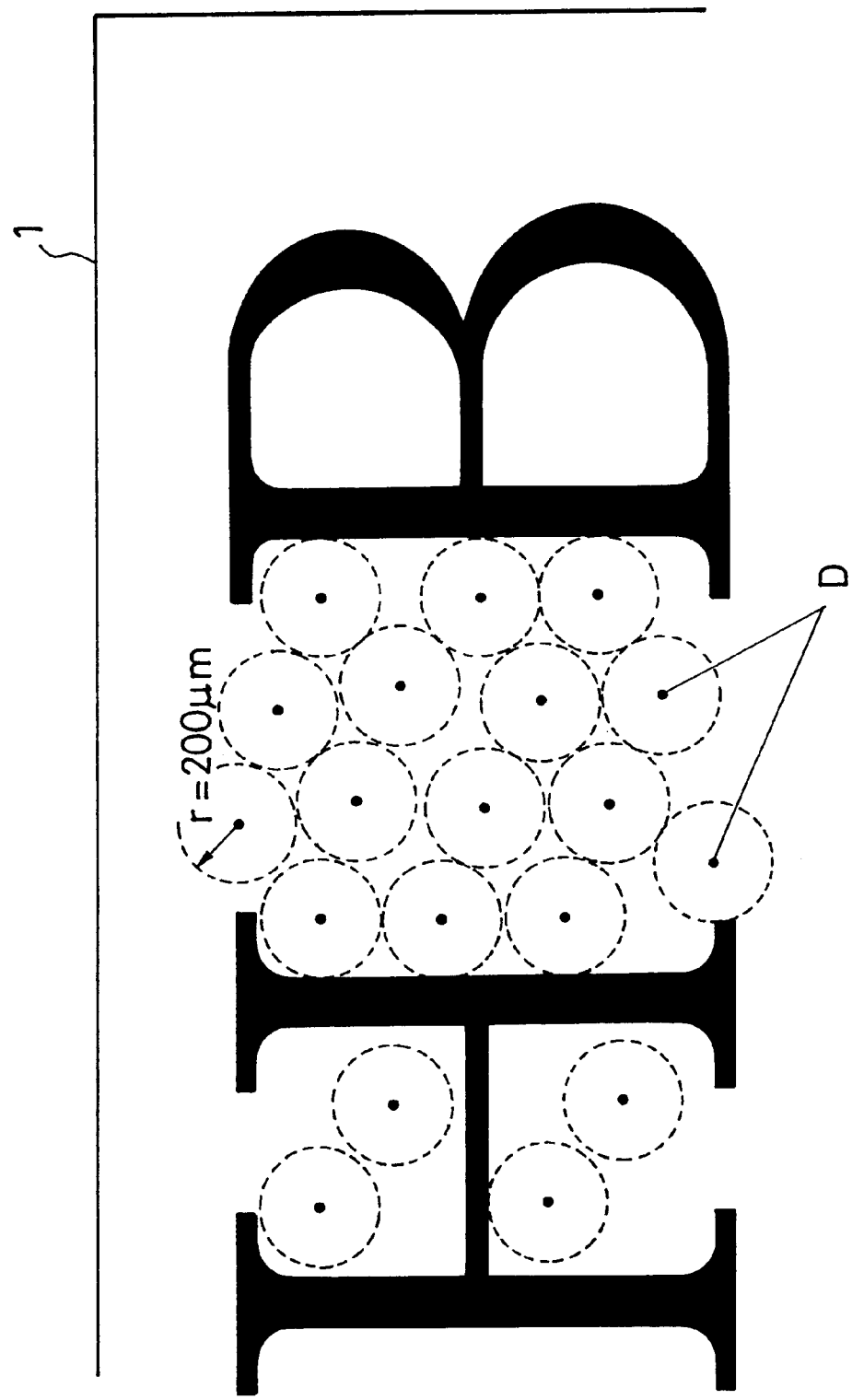
FIG. 11 is a drawing illustrating exposure on the photosensitive member in the third embodiment when the present invention is carried out.

FIGS. 9 to 11 show a third embodiment of the present invention. In this embodiment, the second embodiment is further improved, and the schematic sectional construction of an electrophotographic apparatus is the same as the first embodiment.

In this embodiment, small spot exposure D is carried out at intervals even in a white portion, as in the second embodiment.

In this embodiment, the small spot exposure D is carried out at positions, which are not adjacent to a fundamental black image portion on an image.

This is because, for example, when small spots are adjacent to a black portion on a straight line, as shown in FIG. 9, the linear shape is disordered, and the spots are easily recognized. However, when the small spots are scattered in a white image portion, the white color is seen as a slightly grayish color from a distance, and thus the spots can hardly be recognized by the human eyes. In addition, in a small spot exposure portion D1 adjacent to a large black portion, since the developer 7 is also moved from a adjacent large spot G of the developer 7, as shown by an arrow f in FIG. 10, separately from basic development by the development sleeve 3-1, a large spot is formed, as compared with spot exposure in other portions, i.e., a white image portion where usual small spot exposure portions D0 are scattered.

In this embodiment, in mapping of exposure to the laser beam d for forming an image, adjacent circles having a radius r of about 200 μm are continuously drawn from a basic exposure portion, as shown in FIG. 11, and one spot exposure with a spot diameter of 70 μm is carried out at the center of each of the circles, separately from basic exposure for forming an image. Such image processing permits small spot exposure D in a white image portion so that spots are never adjacent to the basic black image portion.

This embodiment enables a constant supply of a small amount of toner to a white portion of an image without affecting the basic image, and makes it possible to obtain stable good images over a long period of time without the need for appropriately selecting the operation environment and the type of paper.

As described above, in this embodiment, small spot exposure is normally carried out in a specified region in a white image portion, which is not exposed basically, in the horizontal scanning direction, so that spots are never adjacent to an exposure portion for forming a basic image. It is thus possible to prevent the occurrence of poor charging and a flow of an image without deteriorating the basic image, and form an image having a clear outline while suppressing the occurrence of a noise of the cleaning blade noise or peeling of the cleaning blade.

Fourth Embodiment

Figure 12:
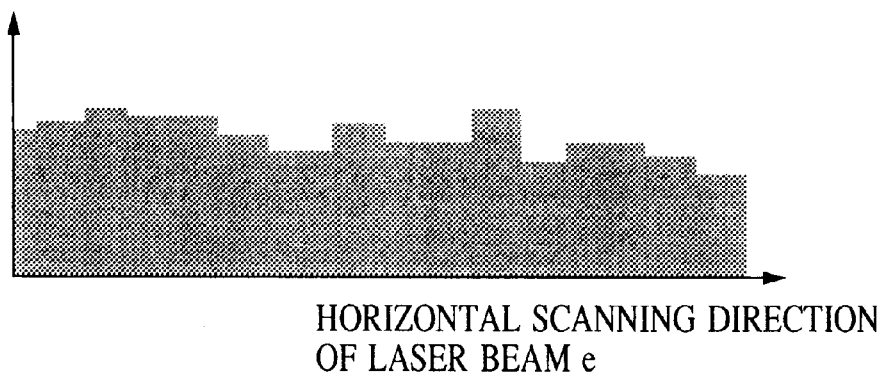
FIG. 12 is a drawing illustrating the integrated by lighting time of a laser beam in accordance with a fourth embodiment.

FIG. 12 shows a fourth embodiment of the present invention. The construction of an electrophotographic apparatus in accordance with this embodiment is the same as the first embodiment.

In this embodiment, an image is formed during the time the image formed on the photosensitive member 1 is not transferred onto the transfer paper 8, i.e., in spaces between respective transfer materials. The image is formed in accordance with the history of the amount of lighting of the laser beam d in the horizontal scanning direction.

This embodiment comprises a mechanism for memorizing the lighting time of the laser beam d in a specified operation time at positions in the horizontal scanning direction on a coordinate axis. Exposure is carried out in spaces between respective transfer materials in an amount inversely proportional to the lighting time.

Figure 13:
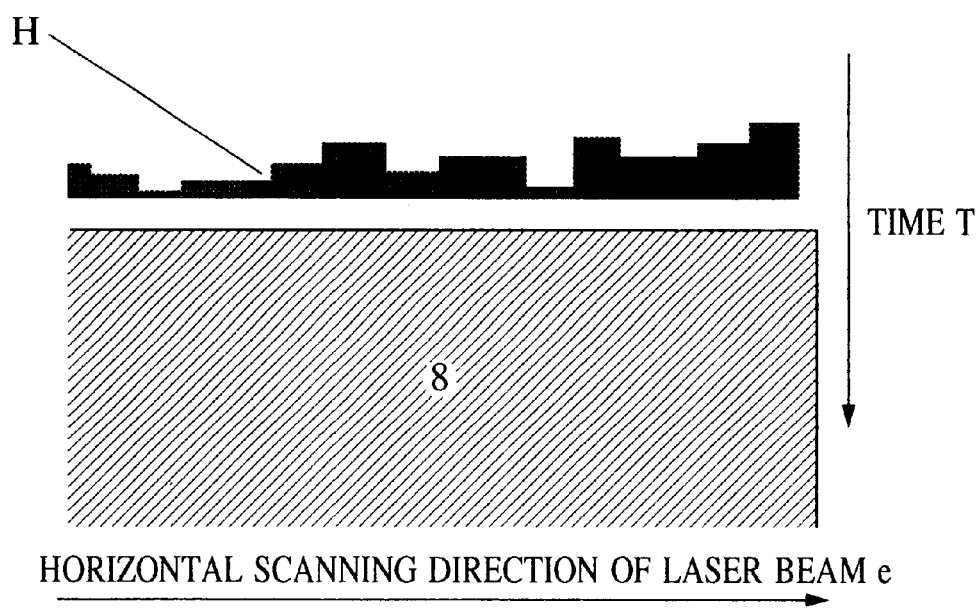
FIG. 13 is a drawing illustrating exposure on an electrophotographic photosensitive member in accordance with the fourth embodiment of the present invention.
Figure 14:
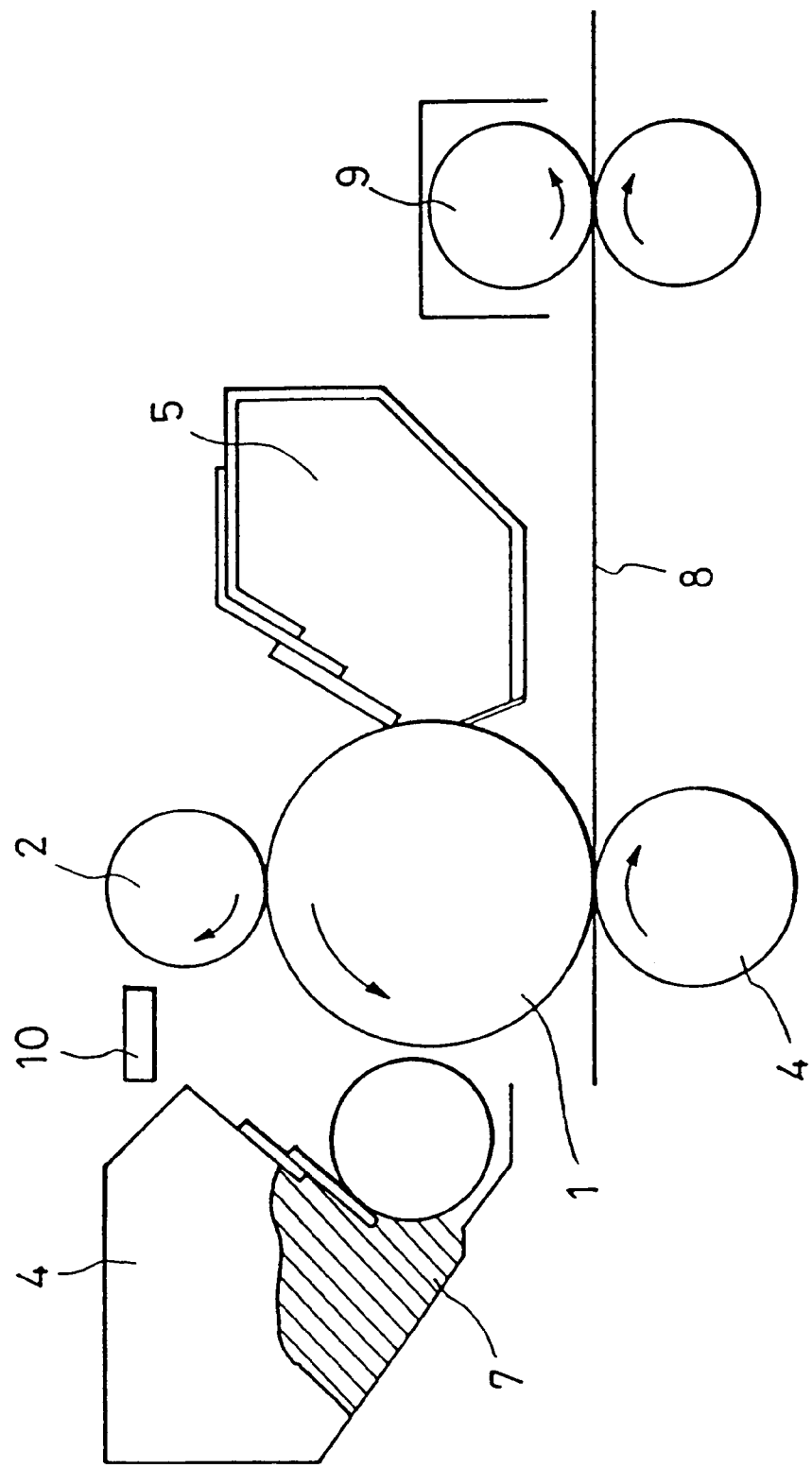
FIG. 14 is a schematic sectional view showing an example of conventional image forming apparatus.

FIG. 12 shows the integrated lighting time of the laser beam d in the horizontal scanning direction, which is memorized during the specified time, and FIG. 13 shows the state of exposure on the photosensitive member 1 in accordance with this embodiment, and the relation between the transfer paper 8 and the time T.

In this embodiment, the amount of the developer supplied to the photosensitive member 1 in the horizontal scanning direction is kept constant in long-term use, and it is possible to avoid the phenomenon of image flow from only occurring in a specified place. It is also possible to avoid excessive consumption of the developer which is caused when a constant amount of developer is normally supplied on the photosensitive member between processes for forming an image on the transfer paper. It is further possible to prevent poor charging even in a portion other than a printing region with the same performance as in the image printing region, without the need for appropriately selecting the operation environment and the type of paper.

As described above, this embodiment is provided with the mechanism for memorizing the lighting time of a laser at each position in the horizontal scanning direction of the laser beam and integrating the lighting time so that exposure is carried out at each position on the photosensitive member in the horizontal scanning direction between the processes for forming an image on the transfer paper in accordance with the lighting time. The embodiment thus has the effect of preventing the occurrence of poor charging without affecting the basic image, and the effect of suppressing the occurrence of a noise of the cleaning blade or peel of the cleaning blade.

As described above, in the present invention, weak exposure or small spot exposure is normally carried out in a specified region in a white image portion, which is not exposed basically, in the horizontal scanning direction to produce a little larger fogging than the fogging which basically occurs in that portion. It is thus possible to prevent the occurrence of poor charging and a flow of an image without deteriorating the image quality, and suppress the occurrence of a noise of the cleaning blade or peel of the cleaning blade. Since the small spot exposure is carried out so that spots are never adjacent to the exposure portion for forming the basic image, the basic image does not deteriorate.

Since the memory mechanism for memorizing and integrating the lighting time of the laser at each position in the horizontal scanning direction of the laser beam is provided so that exposure is carried out at each position on the photosensitive member in the horizontal scanning direction according to the light time between the processes for forming an image on the transfer paper. The present invention has the effect of preventing the occurrence of poor charging and image flow without affecting a basic image, and the effect of suppressing the occurrence of a noise of the cleaning blade or peel of the cleaning blade.

Although, in the above embodiments, the laser beam is used as the image exposure means, digital light including a LED element can also be used.

What is claimed is:

1. An image forming apparatus in which an electrostatic latent image is formed on an electrophotographic photosensitive member with digital light, and electrostatically developed with a developer to form a developed image, and the developed image is transferred onto a transfer material to form an image on the transfer material and a cleaning member is to eliminate residual toner on the photosensitive member after a transferring operation by scraping the photosensitive member, the apparatus comprising:

exposure means for normally performing weak exposure, such that reflective density is increased, only in a specified region on the photosensitive member in a horizontal scanning direction of the digital light, regardless of exposure of the latent image by an exposure device for forming an image; and control means for controlling the specified region, wherein the specified region covers less than a horizontal length of the photosensitive member that is scanned by the digital light such that variations in an amount of developer applied to nonbasic image portions are decreased.

2. An image forming apparatus according to claim 1, wherein the said digital light is a laser beam.

3. An image forming apparatus in which an electrostatic latent image is formed on an electrophotographic photosensitive member by digital light, and electrostatically developed with a developer to form a developed image, and the developed image is transferred onto a transfer material to form an image on the transfer material and a cleaning member is to eliminate residual toner on the photosensitive member after the transferring operation by scraping the photosensitive member, the apparatus comprising:

exposure means for normally performing small spot exposures at intervals, with an interval span being of at least a predetermined amount, only in a specified region on the photosensitive member in a horizontal scanning direction of the digital light, regardless of exposure of the latent image by an exposure device for forming a basic image; and control means for controlling the specified region for performing the small spot exposures, wherein the specified region covers less than a length of the photosensitive member that is scanned by the digital light.

4. An image forming apparatus according to claim 3, wherein the region of spot exposure by the exposure means is never adjacent to a position of exposure for forming the basic image.

5. An image forming apparatus according to claim 3, wherein the said digital light is a laser beam.

6. An image forming apparatus in which an electrostatic latent image is formed on an electrophotographic photosensitive member by digital light, and electrostatically developed with a developer to form a developed image, and the developed image is transferred onto a transfer material to form an image on the transfer material and a cleaning member is to eliminate residual toner on the photosensitive member after the transferring operation by scraping the photosensitive member, the apparatus comprising: exposure means for performing small spot exposure at intervals, with an interval span being of at least a predetermined amount, so that spots are never adjacent to a position of exposure for forming a basic image; and control means for controlling a specified region for performing the small spot exposures.

7. An image forming apparatus according to claim 6, wherein the said digital light is a laser beam.

8. An image forming apparatus in which an electrostatic latent image is formed on an electrophotographic photosensitive member by digital light, and electrostatically developed with a developer to form a developed image, and the developed image is transferred onto a transfer material to form an image on the transfer material and a cleaning member is to eliminate residual toner on the photosensitive member after the transferring operation by scraping the photosensitive member, the apparatus comprising:

a memory device for memorizing an integrated time of exposure by an exposure means for forming an image on the photosensitive member at each of a plurality of positions in the horizontal scanning direction, wherein said memory device memorizes each of the plurality of positions in the horizontal scanning direction individually, wherein the exposure means for forming images on the photosensitive member forms images in spaces between respective transfer materials where no image is formed on the transfer material, according to the exposure time memorized in the memory device.

9. An image forming apparatus according to claim 8, wherein the said digital light is a laser beam.

10. An image forming apparatus comprising:

an electrophotographic photosensitive member;

an electrostatic image forming means for forming an electrostatic image on said photosensitive member, wherein said electrostatic image forming means includes an exposure means for exposing said photosensitive member with a digital light according to image information;

developing means for developing the electrostatic image with toner;

image transfer means for transferring a developed image formed by said developing means from said photosensitive member onto a transfer material; and a cleaning member, which contacts said photosensitive member and removes residual toner from said photosensitive member;

wherein said exposure means performs exposures in a specified region of the background portion of the image on said photosensitive member, said specified region is a part of said photosensitive member in a longitudinal direction of said photosensitive member, regardless of an electrostatic image forming area, and by exposure in the specified region performed by said exposure means, so that fogging toner supplied to the specified region by said developing means is increased.

11. An image forming apparatus according to claim 10, wherein said exposure means performs a weaker exposure in the specified region than in an image region on said photosensitive member.

12. An image forming apparatus according to claim 10, wherein said exposure means performs spot exposures at intervals within said specified region.

13. An image forming apparatus according to either claim 12, wherein said specified region is separate from an image region on said photosensitive member.

14. An image forming apparatus according to claim 10, wherein said specified region is separate from an image region on said photosensitive member.

15. An image forming apparatus according to claim 10, wherein said specified region is provided at an end of said photosensitive member in the longitudinal direction.

16. An image forming apparatus according to claim 15, wherein said developing means comprises a toner carrying member which is opposed to said photosensitive member and carries the toner and a rotatable member which contacts said photosensitive member to regulate a gap present between said photosensitive member and said toner carrying member.

17. An image forming apparatus according to claim 10, wherein said specified region is provided at a center of said photosensitive member in the longitudinal direction.

18. An image forming apparatus according to claim 17, wherein said image forming apparatus comprises a feeding member, which feeds the transfer material and said feeding member contacts the transfer material at a position corresponding to the specified region in the longitudinal direction.

19. An image forming apparatus comprising:

an electrophotographic photosensitive member;

electrostatic image forming means for forming an electrostatic image on said photosensitive member, wherein said electrostatic image forming means includes exposure means for exposing said photosensitive member with a digital light according to image information:

developing means for developing the electrostatic image with toner;

image transfer means for transferring a developing image formed by said developing means from said photosensitive member;

a memory device for memorizing an integrated time of exposure by said exposure means at each of several positions in a horizontal scanning direction;

wherein said exposure means changes an exposure amount to a portion of said photosensitive member region at each of the several positions in the horizontal scanning direction according to exposure time memorized by said memory device, so that said developing means provides toner to a part of said photosensitive member region, which is not in contact with the transfer material.

* * * * *

UNITED STATES PATENT AND TRADEMARK OFFICE
CERTIFICATE OF CORRECTION

PATENT NO. : 6,448,989 B1
DATED : September 10, 2002
INVENTOR(S) : Yasushi Shimizu et al.

It is certified that error appears in the above-identified patent and that said Letters Patent is hereby corrected as shown below:

Column 2,
Line 7, "been" (second occurrence) should be deleted

Column 4,
Line 29, "by" should be deleted

Column 5,
Line 10, "i-the" should read -- the --

Column 7,
Line 32, "a" should read -- an --
Line 61, "a noise of the" should be deleted Column 9,
Lind 58, "exposure" should begin a new paragraph Column 10,
Line 57, "either" should be deleted.

Column 12,
Line 5, "member"; should read -- member; and --

Signed and Sealed this

Sixth Day of May, 2003

JAMES E. ROGAN
*Director of the United States Patent and Trademark Office*